United States Patent [19]

Szentesi et al.

[11] Patent Number: 5,226,101
[45] Date of Patent: Jul. 6, 1993

[54] METHOD OF LASER POLISHING FIBER OPTIC CONNECTORS

[75] Inventors: Otto I. Szentesi; Thomas J. McMahon, both of Hickory, N.C.

[73] Assignee: Siecor Corporation, Hickory, N.C.

[21] Appl. No.: 898,653

[22] Filed: Jun. 15, 1992

[51] Int. Cl.⁵ .................. G02B 6/26; B23K 26/00; C03B 29/00; B24B 1/00
[52] U.S. Cl. ......................... 385/85; 385/77; 385/147; 219/121.61; 219/121.66; 219/121.17; 65/12; 65/61; 65/65; 51/283 R
[58] Field of Search ............ 385/85, 33, 35, 147, 385/76, 77; 219/121.61, 121.62, 121.64, 121.65, 121.66, 121.17, 121.59, 383; 65/61, 65, 12; 51/283 R, 284 R, 131.1, 131.2

[56] References Cited

U.S. PATENT DOCUMENTS

| | | | |
|---|---|---|---|
| 4,135,781 | 1/1979 | Archer | 385/85 X |
| 4,272,926 | 6/1981 | Tamulevich | 51/216 R |
| 4,492,060 | 1/1985 | Clark | 51/283 R |
| 4,510,005 | 4/1985 | Nijman | 156/221 |
| 4,573,760 | 3/1986 | Fan et al. | 385/85 X |
| 4,905,415 | 3/1990 | Moulin | 51/124 R |
| 4,999,955 | 3/1991 | Saito et al. | 51/283 R |
| 5,007,209 | 4/1991 | Saito et al. | 51/283 R |
| 5,136,820 | 8/1992 | Luther | 51/283 R |

FOREIGN PATENT DOCUMENTS

| | | | |
|---|---|---|---|
| 58-108507 | 6/1983 | Japan | 385/85 X |
| 58-108508 | 6/1983 | Japan | 385/85 X |
| 62-237404 | 10/1987 | Japan | 385/85 X |

OTHER PUBLICATIONS

"Formation of a Spherical Lens at Optical Fiber Ends with a $CO_2$ Laser", U. C. Paek and A. L. Weaver, Applied Optics, vol. 14 No. 2, Feb., 1975.

Primary Examiner—Brian Healy
Attorney, Agent, or Firm—J. David Abernethy

[57] ABSTRACT

Disclosed is an improved method for polishing fiber optic connectors. After a light waveguide distal end is mechanically ground and/or polished, the distal end is slightly melted in order to reduce reflectance. Melting may be induced by a laser, microtorch, or electric arc.

8 Claims, 2 Drawing Sheets

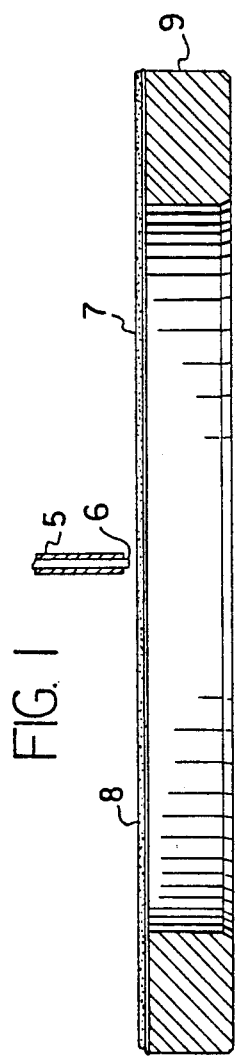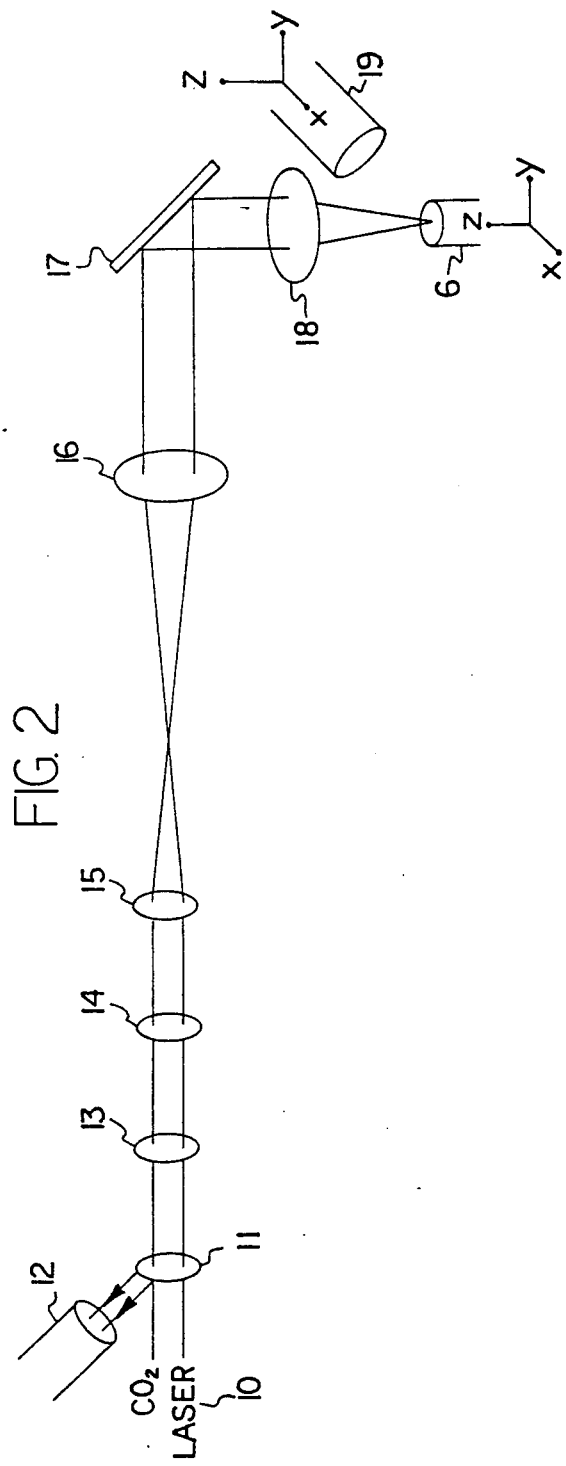

METHOD OF LASER POLISHING FIBER OPTIC CONNECTORS

BACKGROUND OF THE INVENTION

Light waveguide communication cables are increasingly used in the modern network. Practical network planning must take into account that a message may need to travel over a number of different connected cables between the sender and receiver of a message. Cable or light waveguide fiber joints are often made using remateable connectors instead of permanent splices to give needed flexibility. Therefore, the efficient transfer of optical energy ultimately depends upon connection joints having the minimum optical loss. Accuracy is very important, and tolerances are often measured in terms of microns.

Reflections from connectors can degrade transmitter or receiver performance in high-speed and multichannel analog systems. To avoid an excessive link power penalty, the reflectance of individual connectors is sometimes specified.

Various grinding and polishing machines have been proposed to prepare connectors having a desired end face surface. Examples include Saito, et al, U. S. Pat. No. 5,007,209; Moulin, U. S. Pat. No. 4,905,415; Clark, U. S. Pat. No. 4,492,060; and Tamulevich, U. S. Pat. No. 4,272,926.

A separate, and much older, tradition of smoothing glass surfaces is flame polishing. Flame polishing of glassware in the chemical laboratory is quite old and well known. While satisfactory for ordinary polishing, it is believed that the typical Bunsen burner flame is insufficient to produce the precise tolerances needed in the practical production of optical connectors.

In yet another development, lasers have been used to form lens shapes on optical fiber ends by precise adjustment of focusing lenses interposed between the laser and the optical fiber.

SUMMARY OF THE INVENTION

As an addition to or replacement of conventional abrasives polishing of fiber optic connectors, the light waveguide distal end is slightly melted. Melting can be accomplished by the use of microtorch, an electric arc, or a laser beam. It is believed that the best return loss results are obtained by first mechanically grinding or polishing the light waveguide distal end and thereafter performing melting; reliance on melting alone can lead to fiber undercutting due to excessive heat.

BRIEF DESCRIPTION OF THE DRAWINGS

The preferred embodiments will be described with reference to the drawings, in which:

FIG. 1 is a side elevation of conventional abrasives grinding or polishing;

FIG. 2 is a schematic representation of polishing using a laser;

DETAILED DESCRIPTION OF THE PREFERRED EMBODIMENT

Figure 3:
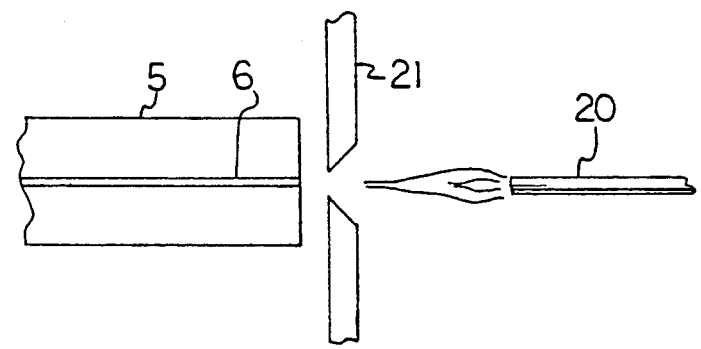
FIG. 3 is a side elevation of polishing using a microtorch.

With reference to FIG. 1, ferrule 5, usually made of a ceramic or a metal alloy, holds therein light waveguide distal end 6. Ferrule 5 and distal end 6 are to be ground or polished by material 8 suspended over polishing wheel 9. An aqueous slurry 7 may optionally be used in conjunction with grinding or polishing.

Mechanical grinding or polishing in FIG. 1 may be accomplished by the use of suitable grinding or polishing machines available from Seikoh Geiken or others, or hand polishing may be used.

A suitable material surface 8 for grinding would be a grinding pad using fine diamond or aluminum particles.

If polishing is preferred, surface 8 may be a woven napless nylon cloth having a four shaft satin weave, 70 denier, $9 \times 120$ count. A suitable aqueous slurry 7 would be a slurry of silicon dioxide particles which are as fine as possible, preferably not exceeding 0.14 micrometers in diameter. A downward pressure 30 to 60 pounds per square inch may be employed.

Figure 4:
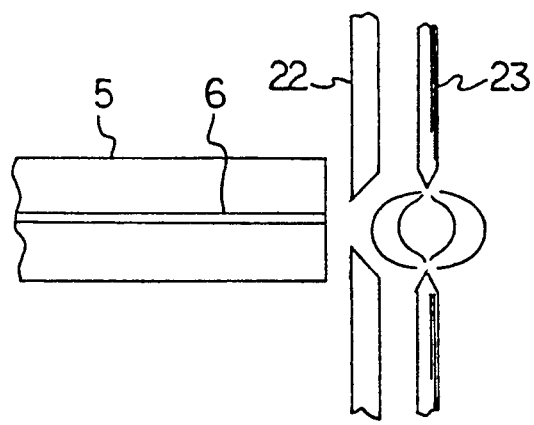
FIG. 4 is a side elevation representing polishing using an electric arc.

After grinding or polishing by mechanical means is complete, light waveguide distal end 6 is slightly melted to achieve better return loss. In FIG. 3, a microtorch 20 is used, and in FIG. 4, electric arc 23 is used. In either case, a ceramic shield 21 or 22 may be necessary to prevent undue damage to ceramic ferrule 5. Microtorch 20 may be a Radio Shack, Archer Gas Brazing torch, Cat. No. 64-2165. The electric arc in FIG. 4 may be generated as in a common arc fusion splicer.

The more preferred approach is that of using a laser as shown in FIG. 2. The light emitted by the laser has a wavelength which is absorbed by the light waveguide rather than being reflected along its length. Alignment of the fiber with a $CO_2$ laser beam is done with the help of a viewer and a fiber optic connector holder which are attached to X, Y, Z micro positioners. A beam splitter and a detector are used for monitoring the power level. A shutter is used for controlling the exposure time. Attenuators are used for selecting power levels. Two lenses are used for enlarging the beam size in order to reduce the spot size. A mirror is used for reflecting the beam downward and a lens is used for focusing the beam on the fiber end face. A positive meniscus lens is used since its major aberration is spherical where a smaller spot size can be achieved.

The procedure consists in finding the position of the focal point by looking at the fluorescence coming from the silica while heated. The positions of the minima of intensities may be found by slowly moving the fiber on each side of the focal point. Thereafter, the position of the focal point is used as a reference for setting the depth of focus. The viewer is then focused on the fiber end face being at the desired depth of focus. Taking advantage of the angle between the fiber and the viewer, a reticule is used for positioning the fiber end faces always at the same depth of focus.

Referring now in detail to the set-up shown in FIG. 2, the $CO_2$ laser has a power output which is adjustable in the 0.1 watt to 10 watt range at 9.3 micrometers with two watts being preferred. Beam splitter 11 is 3 mm thick in ZnSe, O.D.=25 mm, R=25% @45°. Detector 12 is a Scientech power meter model 365. Shutter 13 is a Uniblitz electronic shutter and drive controller. Attenuator 14 is a $5 \times 5$ dB, Lasnix attenuator model 102. Lenses 15, 18 are 2 meniscus in ZnSe, O.D.=25 mm and focal length of 63.5 mm. Lens 16 is 1 planoconvex in ZnSe, O.D.=50 mm, and focal length of 150 mm. Mirror 17 is used to reflect the beam downwards. The laser beam is focused to a 30 $\mu$m nominal spot size on the end of light waveguide distal end 6. The microscope viewer 19 which may be employed is a 6.3× objective and 20× eyepiece.

Several parameters have been tried and optimized. The laser power ranged from 0.5 to 4.4 watts, with an optimized value of 1.5 watts. The exposure time in seconds ranged from 0.5 to 30, with an optimized value of 1.2 seconds. The depth of focus in millimeters ranged from 0 to 1.5, with an optimized value of 0.7 millimeters.

The laser-delivery module may be built around rods to provide the necessary rigidity and stability against thermal drift for the laser mirrors as well as for the beam shaping optics and focusing lens. The laser cavity itself operates in pulse mode with a low average power. This means that no cooling is required and instabilities due to thermal fluctuations are kept to a minimum. For initial peaking of the laser, rep rate up to 1 Hz will be possible.

Pulse length: 0.1 to 1 sec.

Rep rate: 1 Hz for tuning, ≦1 Hz for processing (depends on pulse length)

Monitoring: Pulse to pulse energy on digital readout

Controls: Via remote control module

Different combinations of wavelength, peak power, pulse duration, repetition rate, spot size, etc. may result in different optimum values.

It will be noted that excessive laser power in watts or exposure time in seconds can result in the laser burning a hole in the edge of the light waveguide distal end, resulting in undercutting and excessive loss value.

The above description is intended to be illustrative and is not intended to limit the scope of the claims.

What is claimed is:

1. A method of polishing a glass light waveguide distal end in a fiber optic connector, comprising mechanically polishing said distal end and thereafter slightly melting the surface of said distal end to reduce return loss of the connector.

2. The method of claim 1, wherein a laser beam having a wavelength which is absorbed by the light waveguide performs said melting.

3. The method of claim 1, wherein a microtorch performs said melting.

4. The method of claim 1, wherein an electric arc performs said melting.

5. A method of polishing a glass light waveguide distal end in a fiber optic connector, comprising mechanically grinding said distal end and thereafter slightly melting the surface of said distal end to reduce return loss of the connector.

6. The method of claim 5, wherein a laser beam having a wavelength which is absorbed by the light waveguide performs said melting.

7. The method of claim 5, wherein a microtorch performs said melting.

8. The method of claim 5, wherein an electric arc performs said melting.

* * * * *